United States Patent
Li et al.

(10) Patent No.: US 8,656,409 B2
(45) Date of Patent: Feb. 18, 2014

(54) HIGH PERFORMANCE QUEUE IMPLEMENTATIONS IN MULTIPROCESSOR SYSTEMS

(75) Inventors: Xiao-Feng Li, Beijing (CN); Dz-ching Ju, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1412 days.

(21) Appl. No.: 12/087,182

(22) PCT Filed: Dec. 29, 2005

(86) PCT No.: PCT/CN2005/002377
§ 371 (c)(1),
(2), (4) Date: Jan. 8, 2009

(87) PCT Pub. No.: WO2007/073628
PCT Pub. Date: Jul. 5, 2007

(65) Prior Publication Data
US 2009/0133023 A1 May 21, 2009

(51) Int. Cl.
*G06F 9/54* (2006.01)
(52) U.S. Cl.
USPC .......................................................... 719/312
(58) Field of Classification Search
None
See application file for complete search history.

(56) References Cited

U.S. PATENT DOCUMENTS

| | | | |
|---|---|---|---|
| 6,145,016 A | 11/2000 | Lai et al. | |
| 6,145,061 A | 11/2000 | Garcia et al. | |
| 6,484,224 B1 | 11/2002 | Robins et al. | |
| 6,651,146 B1 | 11/2003 | Srinivas et al. | |
| 6,754,780 B1 * | 6/2004 | Carlson et al. | 711/137 |
| 7,047,245 B2 * | 5/2006 | Jones | 1/1 |
| 7,243,354 B1 * | 7/2007 | Chhabra et al. | 719/314 |
| 2003/0005263 A1 | 1/2003 | Eickemeyer et al. | |

OTHER PUBLICATIONS

"European Application Serial No. 05824013.6, Extended European Search Report mailed Dec. 8, 2008", 9 pgs.
"European Application Serial No. 05824013.6, Office Action mailed Mar. 9, 2009", 6 pgs.
International Search Report for PCT/CN2005/002377 mailed Aug. 10, 2006 (6 pages).
Written Opinion for PCT/CN2005/002377 mailed Aug. 10, 2006 (3 pages).
Supalov, Alexander , "Lock-free collective operations", European PVM/MPI Users' Group Meeting; Recent advances in parallel virtual machine and message passing interface—10th, Lecture Notes in Computer Science, 2003; No. 2840, (2003),276-285.

* cited by examiner

*Primary Examiner* — Andrew Caldwell
*Assistant Examiner* — Benjamin Geib
(74) *Attorney, Agent, or Firm* — Schwegman, Lundberg & Woessner, P.A.

(57) ABSTRACT

Systems and methods provide a single reader single writer (SRSW) queue structure having entries that can be concurrently accessed in an atomic manner with a single memory access. The SRSW queues may be combined to create more complicated queues, including multiple reader single writer (MRSW), single reader multiple writer (SRMW), and multiple reader multiple writer (MRMW) queues.

18 Claims, 10 Drawing Sheets

HIGH PERFORMANCE QUEUE IMPLEMENTATIONS IN MULTIPROCESSOR SYSTEMS

Related Application

This application is a U.S. National Stage Filing under 35 U.S.C. 371 from International Patent Application Serial No. PCT/CN2005/002377, filed Dec. 29, 2005, and published on Jul. 5, 2007 as WO 2007/073628A1, which is incorporated herein by reference in its entirety.

FIELD

The disclosure relates generally to queuing software and more particularly to queuing software for multi-processing environments.

BACKGROUND

From the very beginning of the computer industry, there has been a constant demand for improving the performance of systems in order to run application faster than before, or for running applications that can produce results in an acceptable time frame. One method for improving the performance of computer systems is to have the system run processes or portions of a process (e.g. a thread) in parallel with one another on a system having multiple processors.

A queue is a commonly used data structure used for thread communication and synchronization. Threads can put a data item into the queue (referred to as enqueuing) and other threads can get a data item from the queue (referred to as dequeuing) in a first-in-first-out (FIPO) manner, thus the data are communicated between threads and the activities of the involved threads may be coordinated. Multithreaded applications such as streaming computation, packet processing computation, data-flow computation, etc. employ queues extensively. For example, a multithreaded network application may have one thread process the packet header, then passes the packet through a queue to another thread for packet payload processing.

A major potential performance bottleneck of a queue implementation involves providing concurrent access control, i.e., guaranteeing the correctness of multithreaded concurrent accesses to the queue entries while still maintaining the FIFO property. In existing implementations, the mechanisms used may include: 1) use of a mutually exclusive or atomic critical section, typically implemented with locks or speculations; 2) multiple memory access atomic instructions for load-modify-store, or more generally atomic instructions for multiple-memory-operations, such as atomic compare-exchange or atomic swap; or 3) thread scheduler coordination, such as the task ready queue in a Linux kernel. Unfortunately, each of these mechanisms may introduce significant performance penalties in order to guarantee correct concurrent access to a queue.

DETAILED DESCRIPTION

In the following detailed description of exemplary embodiments of the invention, reference is made to the accompanying drawings that form a part hereof, and in which is shown by way of illustration specific exemplary embodiments in which the inventive subject matter may be practiced. These embodiments are described in sufficient detail to enable those skilled in the art to practice the various embodiments of the invention, and it is to be understood that other embodiments may be utilized and that logical, mechanical, electrical and other changes may be made without departing from the scope of the inventive subject matter. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

Figure 1:
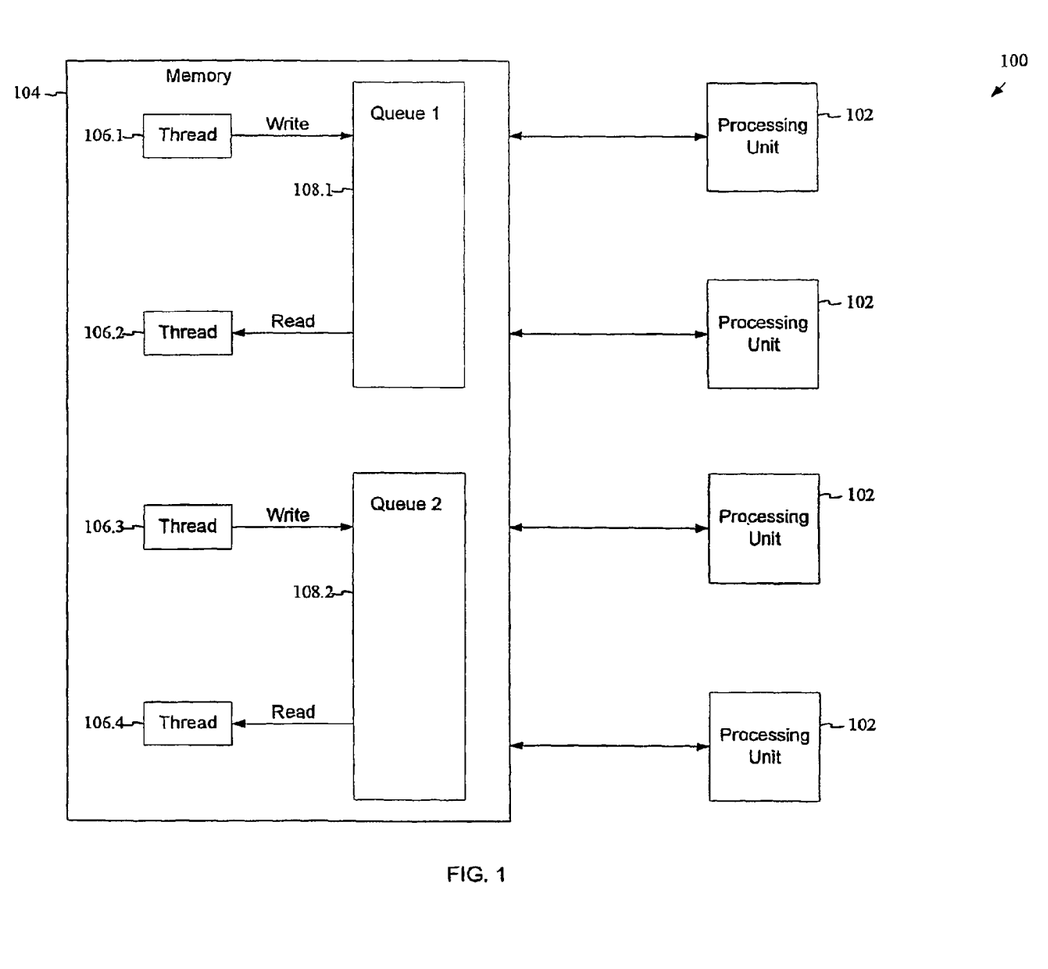
FIG. 1 is a block diagram showing hardware and software components of a system incorporating embodiments of the invention.

FIG. 1 is a block diagram showing hardware and software components of a system 100 incorporating embodiments of the invention. In some embodiments, system 100 includes processing units 102, memory 104, threads 106 and queues 108. In some embodiments, processing units 102 may be processing engines that are part of a multiple core processor. These types of architectures may be referred to as multi-core architectures. Thus, a multi-core processing architecture is logically a single processor having multiple independent processing engines (cores). In alternative embodiments, processing units 102 may be individual processors on a circuit board with multiple processors present on the board. In further alternative embodiments, processing units 102 may each be on a board that is part of a multiple processor board system. In some embodiments, system 100 comprises an SMP (Symmetric Multiprocessing) architecture that makes multiple processing units available to complete individual processes simultaneously (multiprocessing). In SMP, any idle processor can be assigned any task, and additional processing units can be added to improve performance and handle increased loads. Further, processors 102 may be capable of multithreading. Multithreading provides the ability to execute different parts of a program, referred to as threads, simultaneously. It should be noted that while four processing units 102 are illustrated in FIG. 1, no embodiment of the invention is limited to any particular number of processing units 102. Various embodiments may have more or fewer processing units, and in some embodiments, sixteen processing units are used.

Memory 104 may be any type of memory capable of storing programs and data. Examples of such memory include SRAM (Static Ram), DRAM (Dynamic Random Access Memory), SDRAM (Synchronous DRAM), DDR-SDRAM (Double Data Rate SDRAM) or any other type of memory.

Each thread 106 is a part of a program that can execute independently of other threads of a program or process. Threads 106 may execute in parallel on different processors 102. In the various embodiments of the invention, a thread 106 reads and/or writes entries in one or more queues 108. Four threads 106.1-106.4 are shown in FIG. 1, however more or fewer threads 106 may be present in various embodiments.

Queues 108 are data structures that are used to provide a first-in first-out processing of entries in the queue. In other words, the first element inserted into the queue will be the first element removed from the queue. Thus whenever an entry is added, all entries that were added before have to be removed before the most recently added entry can be removed. Two queues 108.1 and 108.2 are illustrated in FIG. 1, however more or fewer queues 108 may be present in various embodiments. Further details on queue data structures used in various embodiments of the invention are provided below with reference to FIGS. 2A-2B.

FIG. 1 illustrates an example embodiment where each of queues 108.1 and 108.2 are single reader single writer (SRSW) queues. That is, a single thread reads from an individual queue, and a single thread writes to an individual queue. In the example shown in FIG. 1, thread 106.1 writes to queue 102.1 and thread 106.2 reads from queue 108.1.

Figure 2A:
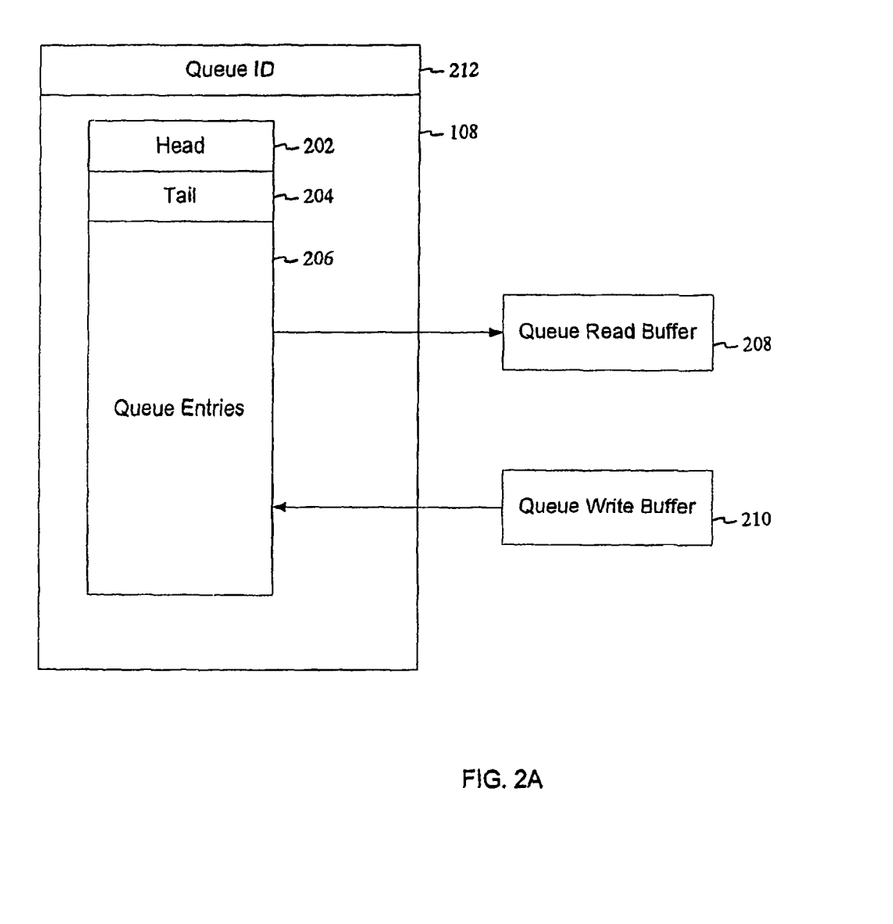
FIG. 2A is a block diagram of a queue data structure according to embodiments of the invention.

FIG. 2A is a block diagram of a queue data structure 108 according to embodiments of the invention. In some embodiments, queue data structure 108 includes a head value 202, a tail value 204 and queue entries 206. In some embodiments, queue entries 206 comprise an array of queue entries having values that are either NULL or non-NULL queue entry values. In some embodiments, the queue entries are pointers to a data object for the queue entry. If a queue entry has a NULL value, then the queue entry is vacant. Any value that is not a valid queue entry value may be used as a NULL value. For example, in the case where the queue entries are pointers to data objects, a value of 0 (zero) or −1 may be used to indicate a NULL value, since these values are not valid pointer values. Additionally, each queue entry in queue entries 206 is aligned on a memory boundary that will provide for atomic access to the queue entry with a single memory access such as a load (read) or a store (write). In some embodiments, queue entries are aligned on word boundaries and are word sized entries. However, any boundary and size may be used that will provide atomic access to the queue entry with a single memory access.

Head value 202 is a reference to the head of a queue 108. The head of the queue is the point in the queue where the next queue entry will be removed from the queue. As entries are removed, the head value is adjusted to refer to the new head entry. In some embodiments, head value 202 is an index into an array of queue entries.

Tail value 204 is a reference to the tail of a queue 108. The tail of the queue is the point in the queue where the next queue entry will be added to the queue. As entries are added, the tail value is adjusted to refer to the next available entry in the queue.

In some embodiments, a queue 108 may include a read buffer 208 and a write buffer 210. Cache performance can be a significant element of queue system performance. In a typical queue access pattern, reads (dequeues) and writes (enqueues) are intermixed with one another. As a result, a read followed by a write, or a write followed by a read may result in a cache miss. The use of a read buffer 208 and a write buffer 210 increases the likelihood that a read followed by a write (or vice versa) results in a cache hit because the read and write buffers may be stored in separate cache lines. Further details on the use of read buffer 208 and write buffer 210 are provided below with reference to FIGS. 3C and 3D.

Further in some embodiments, a queue 108 may have a queue identifier 212. In some embodiments, multiple queues 108 are used to implement a queuing system. In this case, each of the queues 108 may be referred to as a subqueue. A queue ID may be used to identify a queue in the queuing system that is assigned to a particular thread. In some embodiments, queue identifier 212 is what is referred to as a "thread local variable". The use of a thread local variable is desirable because threads of a process typically share the same address space as the process. A thread local variable thus provides a way for a thread to maintain a value that is not shared with other threads in the process.

Figure 2B:
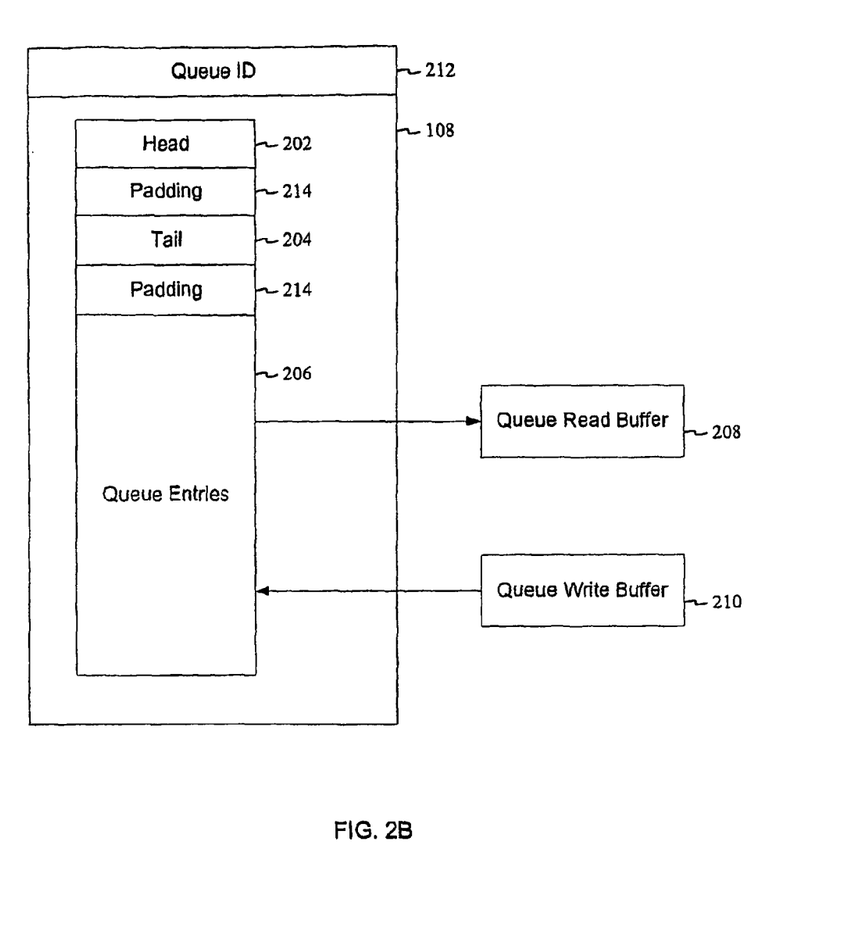
FIG. 2B is a block diagram of a queue data structure according to alternative embodiments of the invention.

FIG. 2B is a block diagram of a queue data structure 108 according to alternative embodiments of the invention. In these embodiments, queue data structure 108 includes padding arrays 214. As noted above, cache performance may have a significant impact on a queue system performance. Thus it is desirable to ensure that head 202, tail 204 and queue entries 206 each occupy different cache lines. In some embodiments, padding array 214 is inserted in the queue data structure and has a size calculated to make sure that the next attribute (e.g. tail or queue entries) are in different cache lines. For example, assume that head 202 is an integer value. A padding array 214 following a head value 202 may be determined to have a size equal to the system's cache line size minus the size of an integer. In alternative embodiments, a compiler directive may be used to ensure that head 202, tail 204 and queue entries 206 are in different cache lines. As an example, the following code fragment uses an "attribute" compiler directive to indicate to the compiler that an integer tail value should be aligned on a cache line boundary:

```
int tail_attribute((aligned(LINE_SIZE));
```

FIGS. 3A-3D are flowcharts illustrating methods for reading and writing queue entries according to embodiments of the invention. The methods may be performed within an operating environment such as that described above with reference to FIG. 1 above. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from machine-readable media such as RAM, ROM, CD-ROM, DVD-ROM, hard disk, flash memory etc.). The methods illustrated in FIGS. 3A-3D are inclusive of the acts performed by an operating environment executing an exemplary embodiment of the invention.

Figure 3A:
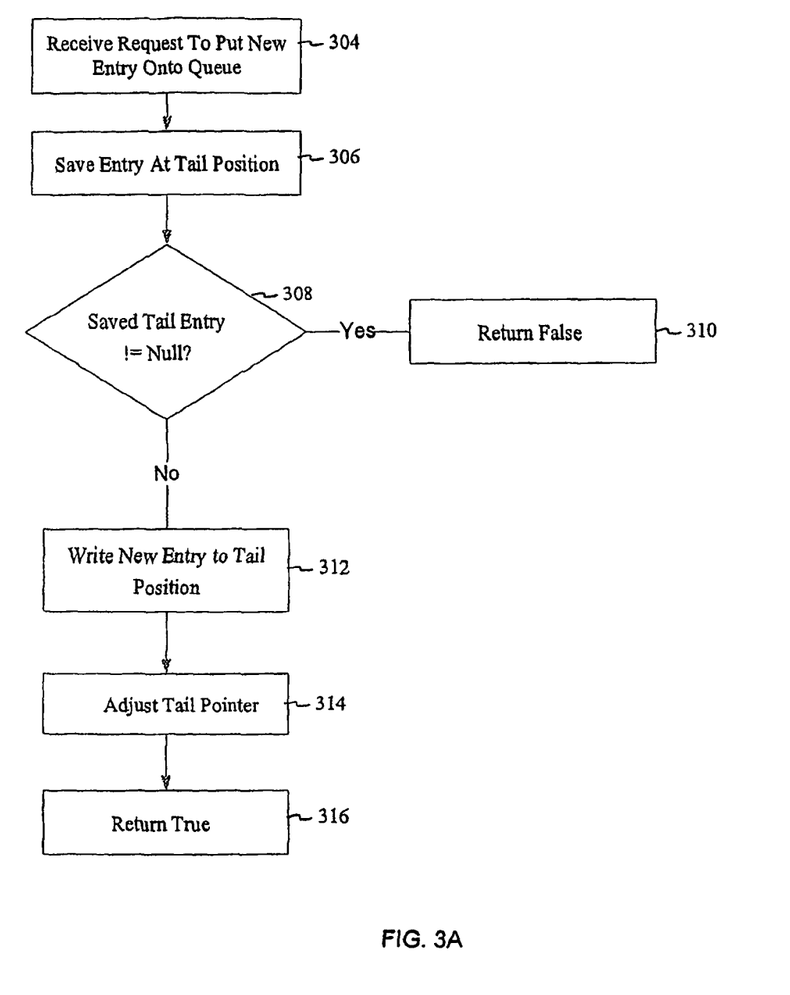
FIG. 3A is a flowchart illustrating a method for reading a queue entry according to embodiments of the invention.

FIG. 3A is a flowchart illustrating a method for writing a queue entry according to embodiments of the invention. In some embodiments, the method begins by receiving a request to put a new entry into a queue (block 304). In some embodiments, the request is in the form of a function call that provides a reference to the queue and to a data (or data pointer) to be placed on the queue (enqueued).

The system saves the current tail entry value (block 306) and then checks to determine if the saved tail entry value is not the NULL value (block 308). If the current saved tail entry value is not NULL, the system indicates that the write failed (block 310). In some embodiments, this is done by returning a FALSE value. In alternative embodiments, a system can retry blocks 306 and 308 by reading and checking that the tail entry value is NULL, thus allowing the write to succeed on a subsequent retry. A write may fail because the queue is full. Alternatively, a write may fail because the head and the tail of the queue are referring to the same queue entry. In this case, a reading thread may not have finished reading the queue entry (and setting the head queue entry to NULL), thus it is desirable that an attempt write a new entry to the queue fail until the read is finished.

If the check at block 308 determines that the saved tail entry is NULL, then the system proceeds to write the new entry to the current tail position (block 312). The tail value is then adjusted to point to the next entry in the queue (block 314). If the queue is a fixed size, the tail value may wrap around to the first queue entry of the last queue entry was written. The method then returns an indication that the write succeeded (block 316). In some embodiments, this is done by returning a TRUE value.

Figure 3B:
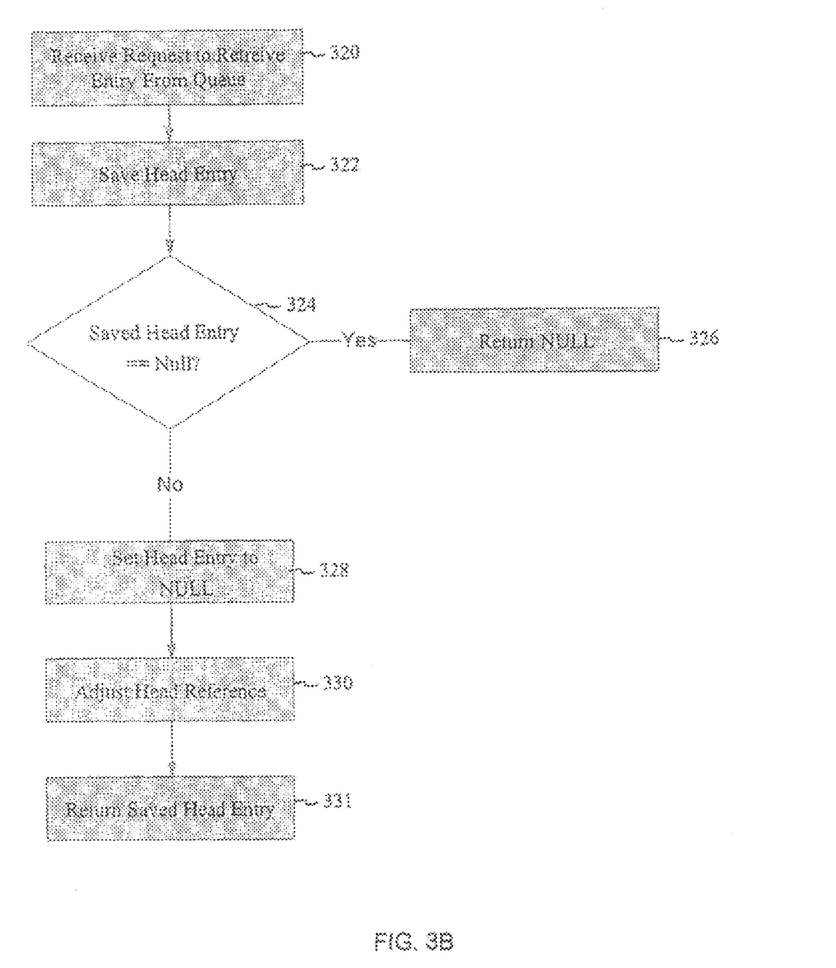
FIG. 3B is a flowchart illustrating a method for writing a queue entry according to embodiments of the invention.

FIG. 3B is a flowchart illustrating a method for reading a queue entry according to embodiments of the invention. The method begins by receiving a request to retrieve an entry from the queue, i.e. to dequeue an entry (block 320). In some embodiments, the request is in the form of a function call that identifies the queue to use.

The system then saves the head entry at the head position of the queue (block 322). Next, the system checks to determine if the saved head entry is equal to the NULL value (block 324). If the saved head entry is NULL, then the system returns the NULL value to the requestor (block 326). A NULL value may indicate that the queue is empty. Alternatively, a NULL value may indicate that the head and the tail refer to the same queue entry, and that a thread writing to the queue has not finished writing the entry yet.

If the check at block 324 determines that the saved head entry is not NULL, then the system sets the current head entry to NULL (block 328) to indicate that the entry has been removed (i.e. dequeued). The system then updates the head pointer to point at the next entry in the queue (block 330), and returns the saved queue entry to the requestor (block 331).

It can be seen that the methods illustrated in FIGS. 3A and 3B provide atomic and concurrent access to a queue and avoid data race conditions. As an initial matter, if the head and the tail references are referring to different queue entries, then reads (dequeues) and writes (enqueues) are atomic with respect to one another as entirely different queue entries are involved. In the case where the head reference and the tail reference both refer to the same queue entry, there are two cases. If the requests to read queue entries (dequeues) or to write queue entries (enqueues) are not interleaved, the requests are atomic with respect to one another. However, if the requests are interleaved, that is, an enqueue is received during a dequeue or a dequeue is received during an enqueue, then either block 306 is executed between block 322 and 330, or block 322 is executed between blocks 306 and 314. In either case, two threads will load the same entry value. Since their checks at blocks 308 and 324 are for opposite condition (NULL or non-NULL), only one of them will find the condition is FALSE, and continues to the store operation at blocks 312 or 328. Thus atomicity is preserved because only one thread updates the queue when read (dequeue) and write (enqueue) requests are interleaved.

Figure 3C:
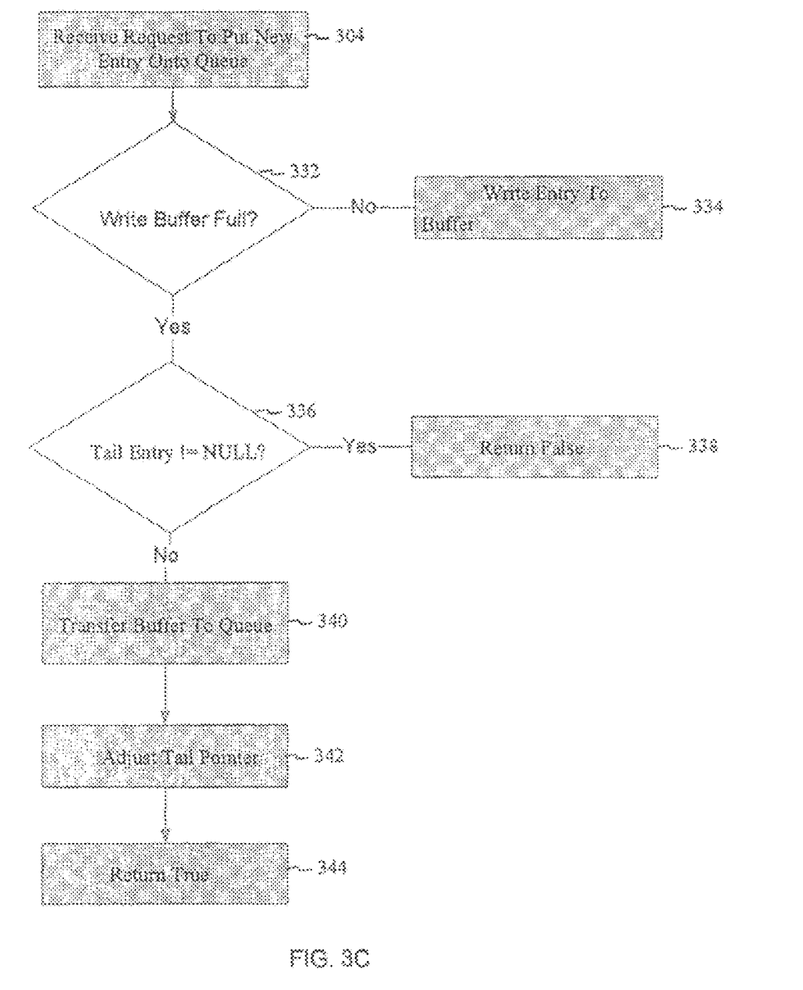
FIG. 3C is a flowchart illustrating an method for leading a buffered queue entry according to embodiments of the invention.

FIG. 3C is a flowchart illustrating a method for writing a buffered queue entry according to embodiments of the invention. As noted above, buffering is desirable because it can reduce the likelihood of a cache miss. In some embodiments of the invention, the buffer size is equal to one cache line size, and the buffer is aligned so that it is mapped to only one cache line. In this way, a buffer load from the queue or a flush to the queue touches only one cache line. At the same time, the queue accesses (enqueue and dequeue) in cache line size granularity incurs less cache misses and can utilize the bulk transfer capability of the memory system. The method begins by receiving a request to place a new entry onto the queue (block 304).

The system then checks if the write buffer is full (block 332). If the buffer is not full, the new entry is placed in the write buffer (block 334) and the method ends.

Otherwise, if the buffer is full, the method checks to see if the current tail entry is not equal to the NULL value (block 336). If the current tail entry is not equal to the NULL value, the queue is full and cannot hold more entries, or the enqueue request is interleaved with a dequeue request and the dequeue has not finished yet. In either case, the method indicates failure to the requestor (block 338).

Otherwise if the tail entry is NULL, then the current queue entries in the write buffer are transferred to the queue (block 340). In some embodiments, the transfer takes place in inverse order, from last to first so that the current tail entry will remain NULL until the complete buffer is written. This is desirable because any interleaved dequeue requests that reach the current tail entry will return a NULL value indicating the queue is empty until the last write (of the first buffer entry) is complete.

Next, the current tail pointer is adjusted (block 342). In some embodiments, the current tail pointer is adjusted by the number of entries transferred from the write buffer to the queue. In alternative embodiments, the tail pointer may be adjusted by a constant equal to the number of total buffer entries. The system then indicates to the requestor that the queue entry was successfully written (block 344).

It should be noted that it is possible for the write buffer to be only partially filled for a relatively long period of time if data is not supplied for entry on the queue. Thus it is desirable to periodically check the write buffer to see if the write buffer is partially full, and to flush the entries from the write buffer to the queue entries. In some embodiments, the time period in which to check for a partially filled buffer is set to be slightly longer than the invocation interval for the queue write (enqueue) function. In alternative embodiments, the time period in which to check for a partially filled buffer may be determined based on the memory latency and the number of memory bus transaction required to transfer items from the write buffer to the queue entries.

In some embodiments, the flush operation writes all the buffer entries into the queue entries even though the buffer may not be full, using the NULL value for any unfilled buffer entries. A queue reader may ignore the NULL entries when it reads queue entries into the read buffer.

Figure 3D:
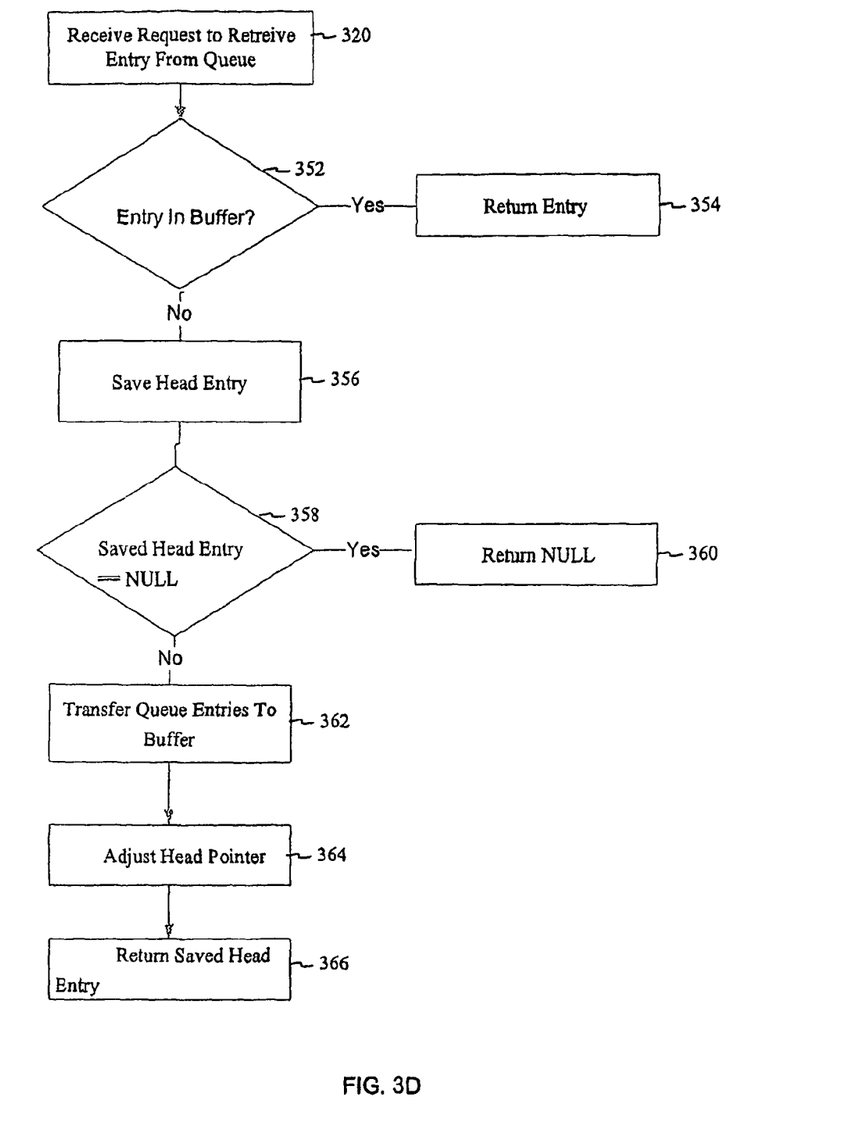
FIG. 3D is a flowchart illustrating a method for writing a buffered queue entry according to embodiments of the invention.

FIG. 3D is a flowchart illustrating a method for reading a buffered queue entry according to embodiments of the invention. The method starts by receiving a request to retrieve an entry from the queue (block 320).

The system then determines if any entries exist in the read buffer (block 352), if so, the first available entry in the read buffer is returned to the requestor (block 354). The contents of the buffer are modified to indicate that the entry has been removed, and a count of entries in the buffer is reduced by one.

If the check at block 352 determines that the buffer is empty, the system saves the current head entry (block 356). The system then determines if the current head entry is equal to the NULL value (block 358). If the current head entry is NULL, the system returns a NULL value to the requestor (block 360). This indicates that either the queue is empty, or that the head and the tail of the queue refer to the same entry, and an enqueuer writing an entry to the queue has not finished yet.

If the check at block 358 indicates that the queue is not empty (i.e. the saved head entry is not NULL), then the system proceeds to transfer entries from the queue to the read buffer (block 362). As each entry is transferred, it is checked to determine if it is a NULL value. In some embodiments, the transfer stops if the read buffer is filled. Further, the transfer may stop if a NULL queue entry is read, which means the remaining queue entries are all NULL and thus ignored for this buffer load.

The head reference is then adjusted (block 364). In some embodiments, the head reference is adjusted by the number of queue entries transferred to the read buffer. In alternative embodiments, the head reference is adjusted by a constant, equal to the number of the total buffer entries. The method ends by returning the saved head entry value to the requestor (block 366).

Figure 4:
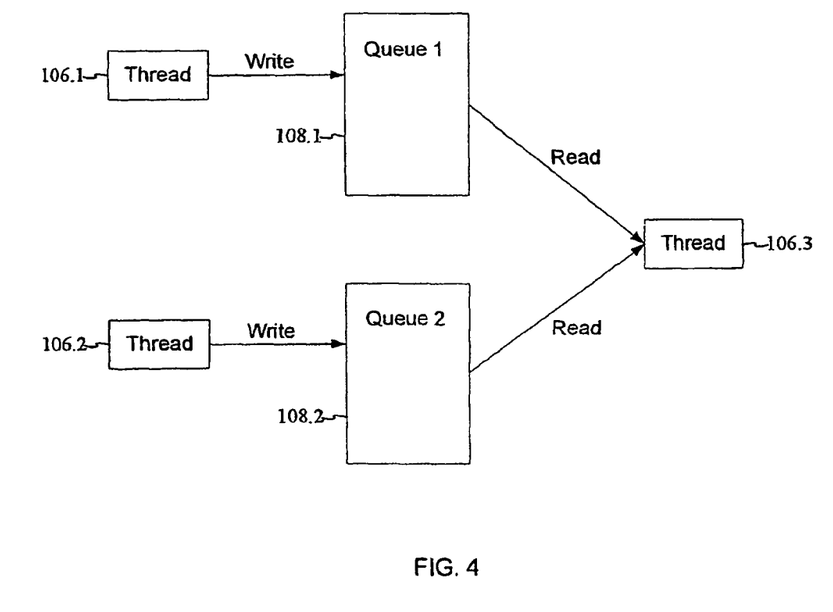
FIG. 4 is a block diagram illustrating a software components for a multiple writer single reader queuing system according to embodiments of the invention.
Figure 5:
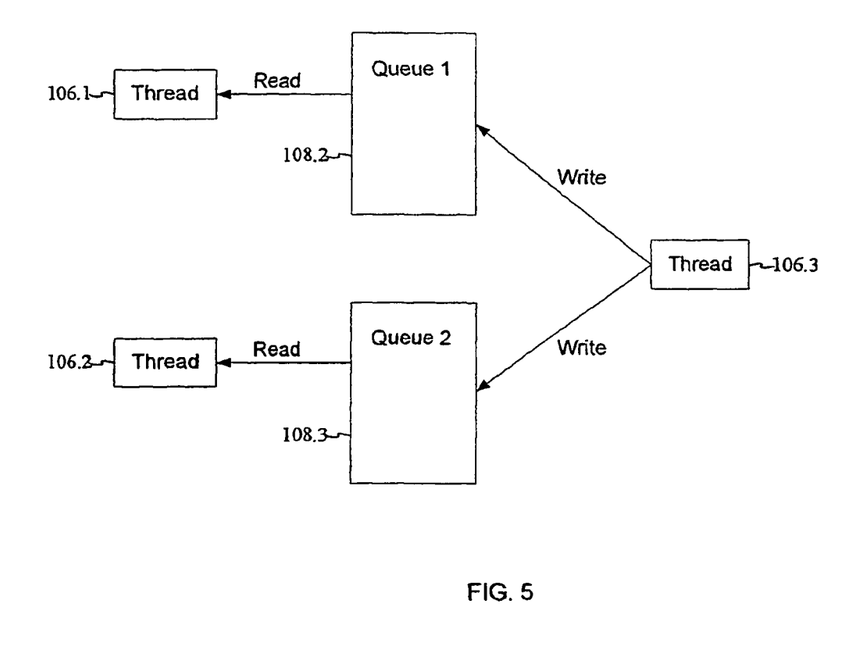
FIG. 5 is a block diagram illustrating software components for a single writer multiple reader queuing system according to embodiments of the invention.
Figure 6:
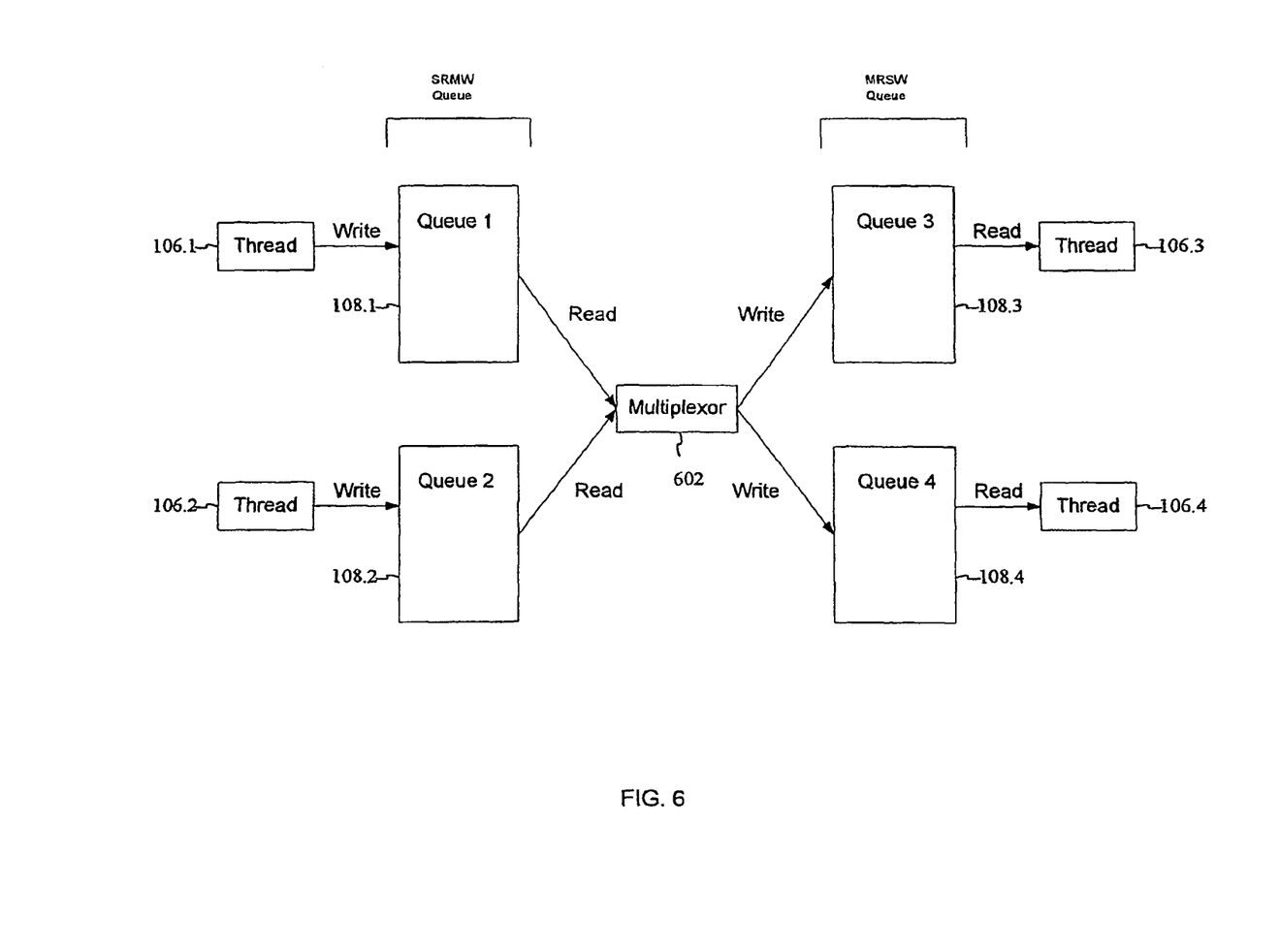
FIG. 6 is a block diagram illustrating software components for a multiple writer multiple reader queuing system according to embodiments of the invention.

The systems and methods provided above describe what may be referred to as a single reader single writer (SRSW) queue. FIGS. 4-6 below describe embodiments that use SRSW queues as building blocks to create more extensive and flexible queuing systems.

FIG. 4 is a block diagram illustrating software components for a single reader multiple writer queue system (SRMW) according to embodiments of the invention. In the example configuration illustrated in FIG. 3, two SRSW queues 108.1 and 108.2 are created. Two threads, 106.1 and 106.2 are associated with queues 108.1 and 108.2 respectively. In some embodiments of the invention, each thread maintains a queue identification 212 in a thread local variable. Thread 106.3 is a thread that reads from both queues 108.1 and 108.2. As can be seen from FIG. 3, each queue has a single writer and a single reader thread. As described above, such queues support concurrent atomic access to the queue entries. Thus the SRMW queuing system illustrated in FIG. 4 is also able to support concurrent atomic access to the entries in each individual queue 108. Although two queues have been illustrated in FIG. 4, various embodiments may support more than two queues. In fact an arbitrary number "n" of write thread may be supported as long as each individual queue created as part of the SRMW queuing system is a SRSW queue that has one reader and one writer. In some embodiments, the single reader thread reads from the queues 108.1-108.n in a round robin fashion (e.g., in the order of 108.1, 108.2, . . . 108.n, 108.1, 108.2 . . . 108.n, and so on). In alternative embodiments, the single reader thread may read from queues 108.1-108.n in a swing fashion (e.g., in the order of 108.1, 108.2, . . . 108.n, 108.n, 108.n−1, . . . 108.2, 108.1, and so on).

FIG. 5 is a block diagram illustrating software components for a multiple reader single writer (MRSW) queuing system according to embodiments of the invention. In the example shown in FIG. 5, two queues 108.1 and 108.2 each have one reader thread, threads 106.1 and 106.2 respectively, and a single writer thread 106,3 that writes to both queues. Again, because each individual queue 108.1 and 108.2 is a SRSW queue, the MRSW queuing system illustrated in FIG. 5 can provide concurrent atomic access to the queue entries in queues 108.1 and 108.2. Although two queues have been illustrated in FIG. 5, various embodiments may support more than two queues. In fact an arbitrary number "n" of read threads may be supported as long as each individual queue created as part of the MRSW queuing system is a SRSW queue that has one reader thread and one writer thread. In some embodiments, write thread 106.3 writes to the queues 108.1-108.n in a round robin fashion. In alternative embodiments, the write thread 106.3 may write to queues 108.1-108.n in a swing fashion.

FIG. 6 is a block diagram illustrating software components for a multiple writer multiple reader (MRMW) queuing system according to embodiments of the invention. In the example shown in FIG. 6, four queues 108.1-108.4 are created. Two threads are write threads (threads 106.1 and 106.2) and two threads are read threads (106.3 and 106.4). A multiplexer thread 602 is created that reads from queues 108.1 and 108.2 and writes to queues 108.3 and 108.4. Multiplexer thread 602 is what may be referred to as a helper thread in that its purpose is to assist in queue processing by reading and distributing (i.e. multiplexing) queue entries between various read and write threads, while the read and write threads may do processing on the queue entries.

In each of the multiple queue embodiments illustrated in FIGS. 4-6 (i.e. the SRMW, MRSW and MRMW queuing systems) the SRSW queues used to create the larger SRMW, MRSW or MRMW queue may be referred to as subqueue. The count of the subqueues in a queue can be determined at any of programming time, compilation time or runtime. At programming time, a programmer may specify the subqueue count by counting the number of readers and writers. At compile time, the compiler will perform program analysis to deduce how many readers or writers will exist, and then determines the subqueue count. At runtime, a runtime system may dynamically increase the subqueue number every time a new thread accesses a queue, and decrease the subqueue number when a thread exits. In some embodiments, if queue entries remain in a queue when a reader thread exits, the remaining queue entries may be transferred (e.g. by a multiplexer thread) to a new queue that has a reader thread associated with it. In alternative embodiments the system may tolerate a "lossy" queue and the remaining queue entries can simply be dropped.

Systems and methods for providing a multithreaded queuing system have been described. This application is intended to cover any adaptations or variations of the embodiments of the invention. It is to be understood that the above description is intended to be illustrative, and not restrictive. Many other embodiments will be apparent to those of skill in the art upon reviewing the above description. Therefore, it is manifestly intended that the inventive subject matter be limited only by the following claims and equivalents thereof.

What is claimed is:

1. A system comprising:
   a first queue having a plurality of first queue entries, each of the first queue entries occupying a memory portion atomically accessible in a single memory access;
   a second queue having a plurality of second queue entries, each of the second queue entries occupying a memory portion atomically accessible in a single memory access;
   a third queue having a plurality of third queue entries, each of the third queue entries occupying a memory portion atomically accessible in a single memory access;
   a fourth queue having a plurality of fourth queue entries, each of the fourth queue entries occupying a memory portion atomically accessible in a single memory access;
   a first thread to write to the first queue;
   a second thread to write to the second queue;
   a multiplexer thread to read the first queue and the second queue and to write to the third queue and the fourth queue;
   a third thread to read from the third queue; and
   a fourth thread to read from the fourth queue.

2. The system of claim 1, wherein the first queue, the second queue, the third queue and the fourth queue are dynamically created.

3. The system of claim 1, wherein the first queue, the second queue, the third queue and the fourth queue each have a plurality of queue entries, the queue entries having a valid value and a NULL value, and wherein during a read a queue entry of the plurality of queue entries is returned if the queue entry has the valid value and wherein during a write the queue entry is written if the queue entry has the NULL value.

4. The system of claim 1, wherein the first queue includes a head value to identify a head entry of the plurality of first queue entries, and wherein the head value is aligned on a cache line boundary.

5. The system of claim 1, wherein the first queue includes a tail value to identify a tail entry of the plurality of queue entries, and wherein the tail value is aligned on a cache line boundary.

6. The system of claim 1, wherein the plurality of first queue entries are aligned on a cache line boundary and wherein the respective memory portions for each of the plurality of first queue entries are aligned a word boundary.

7. A method comprising:
   initializing a first queue having a plurality of first queue entries, each of the first queue entries occupying a memory portion atomically accessible in a single memory access;
   initializing a second queue having a plurality of second queue entries, each of the second queue entries occupying a memory portion atomically accessible in a single memory access;
   initializing a third queue having a plurality of third queue entries, each of the third queue entries occupying a memory portion atomically accessible in a single memory access;
   initializing a fourth queue having a plurality of fourth queue entries, each of the fourth queue entries occupying a memory portion atomically accessible in a single memory access;
   using a first thread to write to the first queue;
   using a second thread to write to the second queue;
   using a multiplexer thread to read the first queue and the second queue and to write to the third queue and the fourth queue;
   using a third thread to read from the third queue; and
   using a fourth thread to read from the fourth queue.

8. The method of claim 7, dynamically creating the first queue, the second queue, the third queue and the fourth queue.

9. The method of claim 7, wherein the first queue, the second queue, the third queue and the fourth queue each have a plurality of queue entries, the queue entries having a valid value and a NULL value, and wherein during a read a queue entry of the plurality of queue entries is returned if the queue entry has the valid value and wherein during a write the queue entry is written if the queue entry has the NULL value.

10. The method of claim 7, wherein the first queue includes a head value to identify a head entry of the plurality of first queue entries, and wherein the head value is aligned on a cache line boundary.

11. The method of claim 7, wherein the first queue includes a tail value to identify a tail entry of the plurality of queue entries, and wherein the tail value is aligned on a cache line boundary.

12. The method of claim 7, wherein the plurality of first queue entries are aligned on a cache line boundary and wherein the respective memory portions for each of the plurality of first queue entries are aligned a word boundary.

13. A non-transitory machine-readable medium including instructions that, when executed by the machine, cause the machine to perform operations comprising:
   initializing a first queue having a plurality of first queue entries, each of the first queue entries occupying a memory portion atomically accessible in a single memory access;
   initializing a second queue having a plurality of second queue entries, each of the second queue entries occupying a memory portion atomically accessible in a single memory access;
   initializing a third queue having a plurality of third queue entries, each of the third queue entries occupying a memory portion atomically accessible in a single memory access;
   initializing a fourth queue having a plurality of fourth queue entries, each of the fourth queue entries occupying a memory portion atomically accessible in a single memory access;
   using a first thread to write to the first queue;
   using a second thread to write to the second queue;
   using a multiplexer thread to read the first queue and the second queue and to write to the third queue and the fourth queue;
   using a third thread to read from the third queue; and
   using a fourth thread to read from the fourth queue.

14. The machine-readable medium of claim 13, wherein the operations include dynamically creating the first queue, the second queue, the third queue and the fourth queue.

15. The machine-readable medium of claim 13, wherein the first queue, the second queue, the third queue and the fourth queue each have a plurality of queue entries, the queue entries having a valid value and a NULL value, and wherein during a read a queue entry of the plurality of queue entries is returned if the queue entry has the valid value and wherein during a write the queue entry is written if the queue entry has the NULL value.

16. The machine-readable medium of claim 13, wherein the first queue includes a head value to identify a head entry of the plurality of first queue entries, and wherein the head value is aligned on a cache line boundary.

17. The machine-readable medium of claim 13, wherein the first queue includes a tail value to identify a tail entry of the plurality of queue entries, and wherein the tail value is aligned on a cache line boundary.

18. The machine-readable medium of claim 13, wherein the plurality of first queue entries are aligned on a cache line boundary and wherein the respective memory portions for each of the plurality of first queue entries are aligned a word boundary.

* * * * *

UNITED STATES PATENT AND TRADEMARK OFFICE
CERTIFICATE OF CORRECTION

PATENT NO. : 8,656,409 B2  
APPLICATION NO. : 12/087182  
DATED : February 18, 2014  
INVENTOR(S) : Li et al.

Page 1 of 1

It is certified that error appears in the above-identified patent and that said Letters Patent is hereby corrected as shown below:

In the Claims

In column 9, line 22, in Claim 6, before "a", insert --on--, therefor

In column 10, line 8, in Claim 12, before "a", insert --on--, therefor

In column 10, line 57, in Claim 18, before "a", insert --on--, therefor

Signed and Sealed this
Second Day of December, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,656,409 B2 | Page 1 of 1 |
| APPLICATION NO. | : 12/087182 | |
| DATED | : February 18, 2014 | |
| INVENTOR(S) | : Li et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1603 days.

Signed and Sealed this
Second Day of June, 2015

Michelle K. Lee
*Director of the United States Patent and Trademark Office*